Aug. 14, 1928.
H. C. HILKE
1,680,331
SAWING MACHINE
Filed Feb. 12, 1926    5 Sheets-Sheet 2
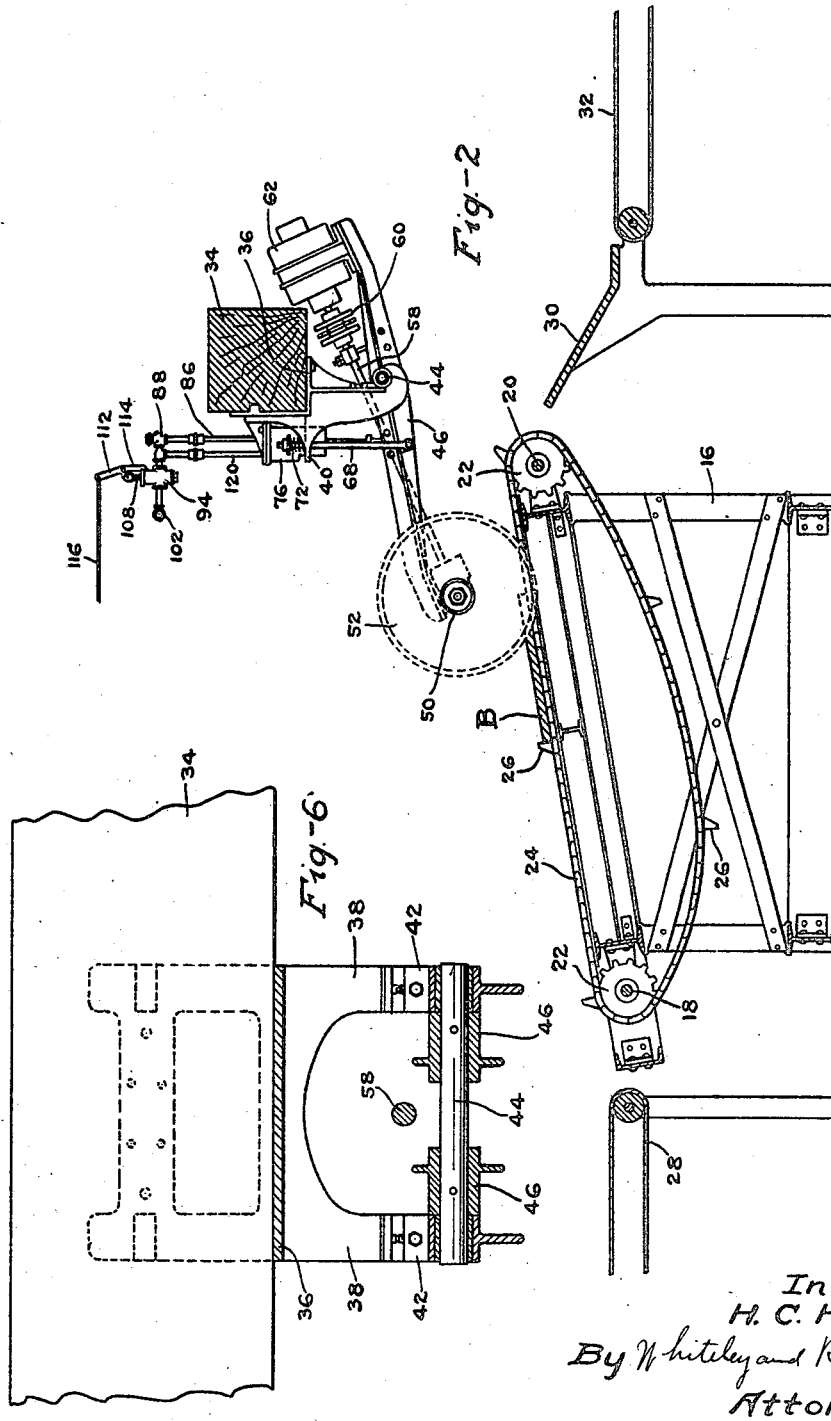
Inventor:
H. C. Hilke
By Whiteley and Ruckman
Attorneys.

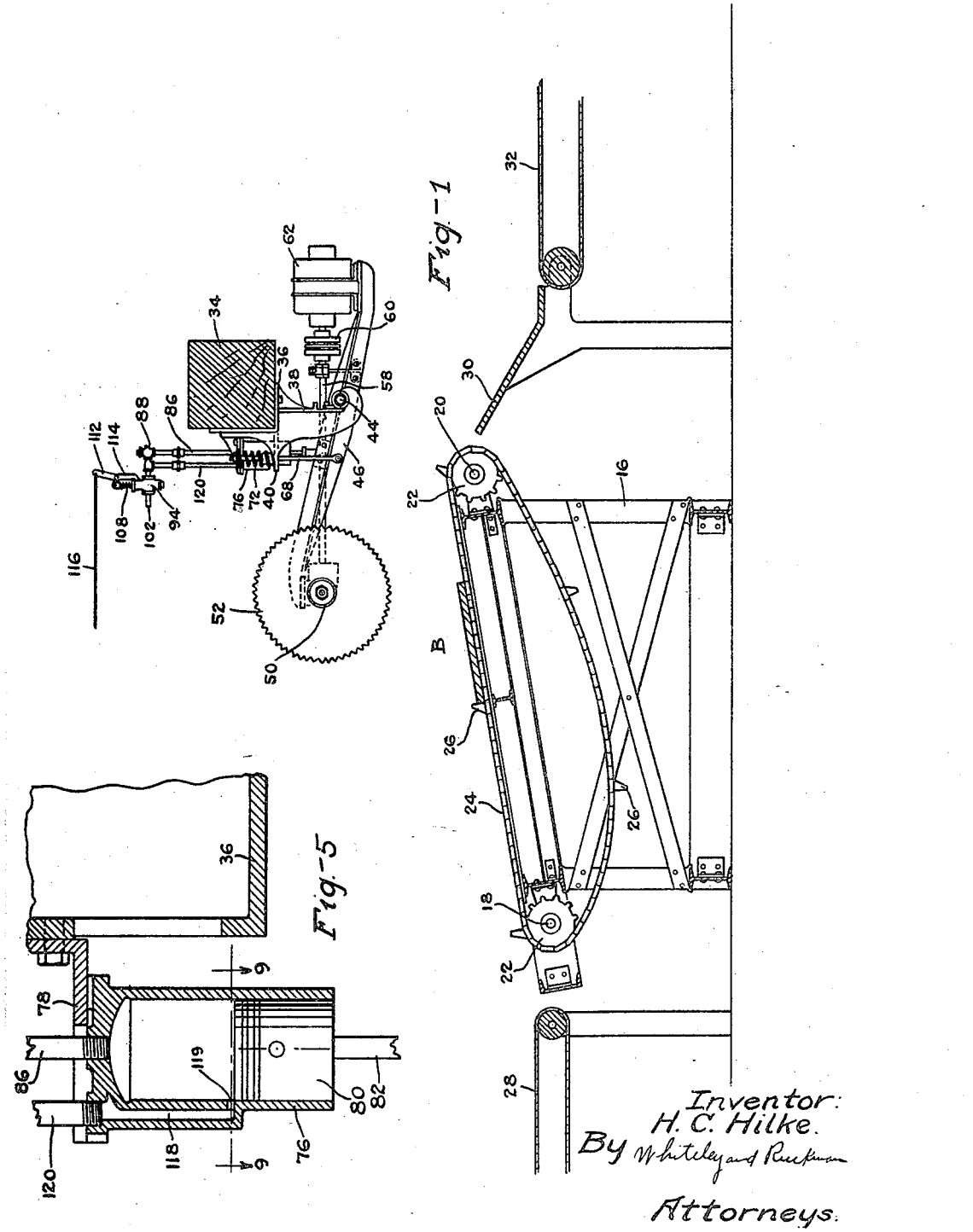

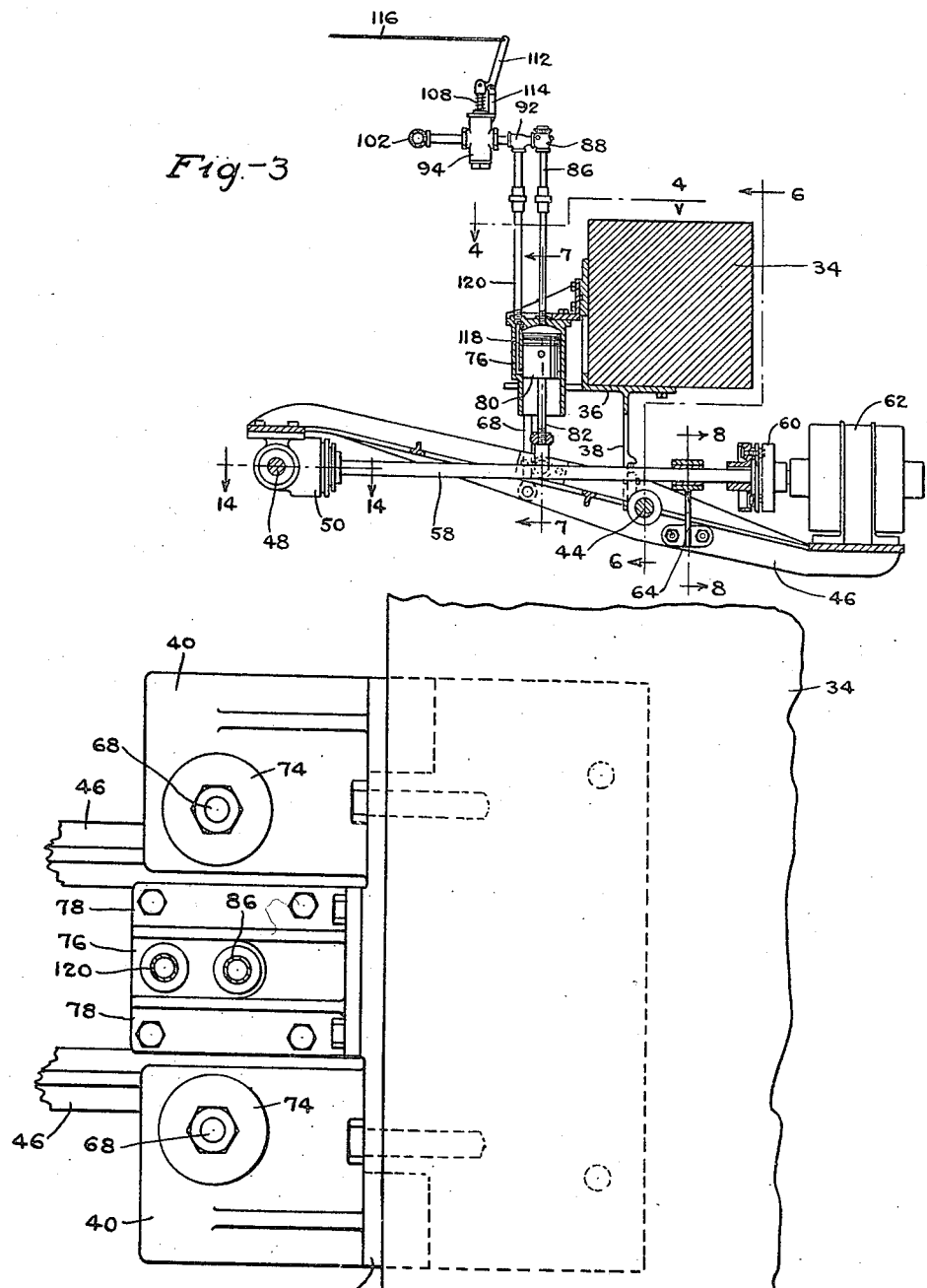

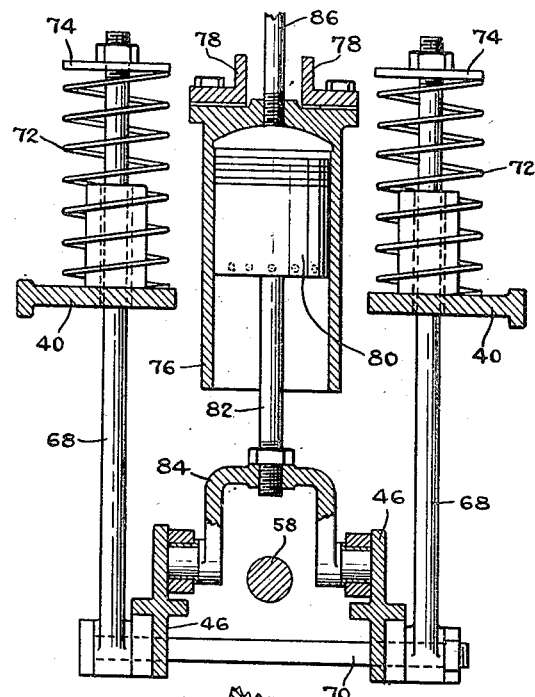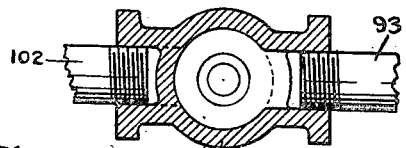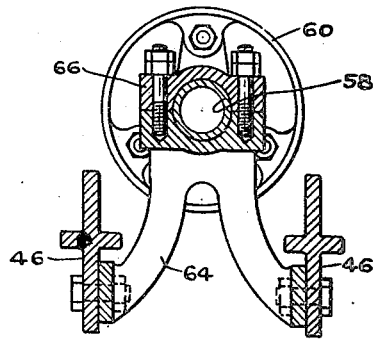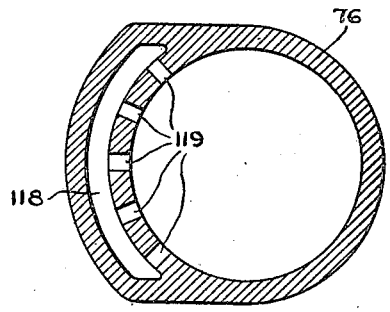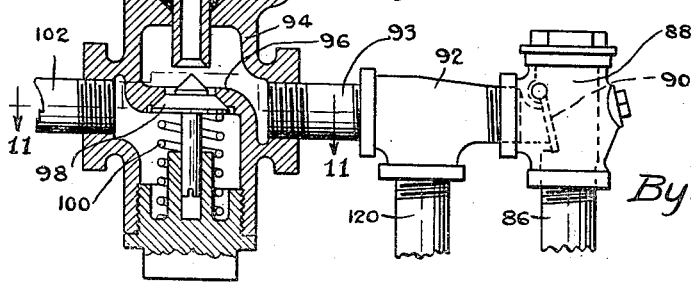

Aug. 14, 1928.

H. C. HILKE 1,680,331

SAWING MACHINE

Filed Feb. 12, 1926     5 Sheets-Sheet 5

Inventor:
H. C. Hilke.
By Whiteley and Ruckman
Attorneys.

Patented Aug. 14, 1928.

1,680,331

UNITED STATES PATENT OFFICE.

HENRY C. HILKE, OF SEATTLE, WASHINGTON.

SAWING MACHINE.

Application filed February 12, 1926. Serial No. 87,783.

My invention relates to sawing machines. An object is to provide in combination with means for feeding boards, a circular saw mounted on a swinging support which is swung to bring the saw into cutting engagement with the boards by means of mechanism operated by a fluid such as compressed air. Another object is to provide a device of this character in which compressed air is applied to cause the saw to move rapidly into cutting engagement and in which the compressed air is released in such manner that the saw is brought out of cutting position by a movement which at first is rapid and is then slowed so as to produce a cushioning effect in order to prevent shocks. Another object is to provide a machine in which the boards are fed in transverse position and cut into lengths by a plurality of circular saws arranged in transversely spaced relationship to each other and in which the saws are carried by independently swinging supports which are swung in unison into cutting position.

The full objects and advantages of my invention will appear in connection with the detailed description, and the novel features of my inventive idea will be particularly pointed out in the claims.

In the accompanying drawings which illustrate a practical embodiment of my invention,—

Figure 12:
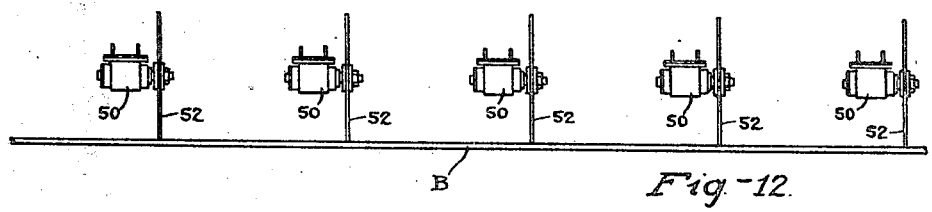
Figure 13:
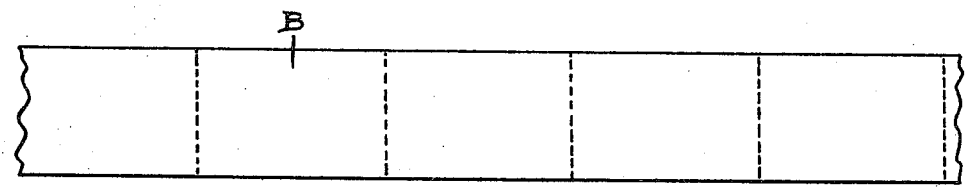
Figure 14:
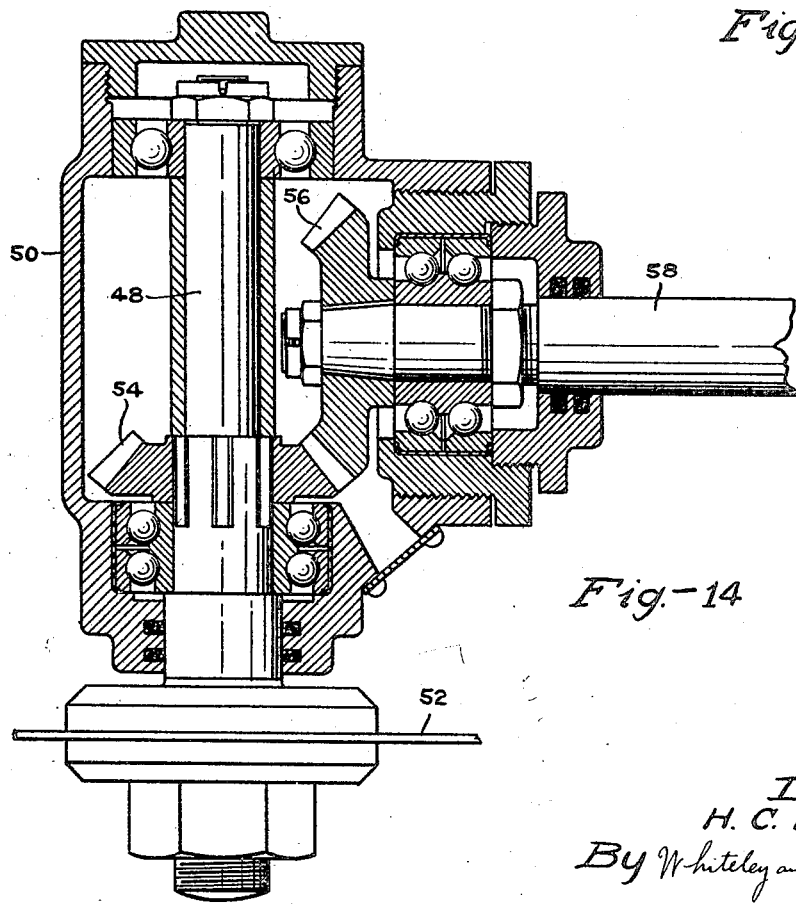

Fig. 1 is a view of the machine partly in side elevation and partly in longitudinal section and with the parts in the position they assume when the saws are raised. Fig. 2 is a similar view but showing the parts in the position they assume when the saws are depressed for the cutting operation. Fig. 3 is a view on an enlarged scale of the saw operating mechanism taken in vertical section through a cylinder thereof and with the piston raised. Fig. 4 is a view in horizontal section on the line 4—4 of Fig. 3. Fig. 5 (Sheet 1) is a fragmentary view on an enlarged scale showing the cylinder in section and the piston in lowered position. Fig. 6 (Sheet 2) is a view in section on the line 6—6 of Fig. 3. Fig. 7 (Sheet 4) is a view in section on the line 7—7 of Fig. 3 on an enlarged scale. Fig. 8 is a view in section on the line 8—8 of Fig. 3 on an enlarged scale. Fig. 9 is a view in section on the line 9—9 of Fig. 5 with the piston removed. Fig. 10 is a view in vertical section through the valve mechanism. Fig. 11 is a view in section on the line 11—11 of Fig. 10. Fig. 12 (Sheet 5) is a rear view of the saws and head of the machine. Fig. 13 is a plan view of a board in which the position of the cuts made by the saws are indicated in dotted lines. Fig. 14 is a view on an enlarged scale taken in section on the line 14—14 of Fig. 3.

As shown in Figs. 1 and 2, I provide a frame 16 which supports two shafts 18 and 20 secured to which are sprocket wheels 22 around which pass sprocket chains 24 provided at intervals with outstanding lugs 26 for engagement with boards such as indicated at B. The shafts may be driven in any suitable manner and the shaft 20 is at a higher level than the shaft 18 so that the boards will be fed upwardly at an angle to a horizontal plane. The boards in transverse position may be taken to the feeding chains 24 by a conveyor 28, and the sawed pieces drop down a chute 30 from which they pass to a conveyor 32. The boards which are fed by the chains 24 are sawed into lengths by mechanism which will now be described. A supporting beam 34 extends transversely with relation to the travel of the feeding chains and is located somewhat above the delivery end thereof. At spaced intervals along this beam, brackets 36 are secured, each of these brackets having two downwardly extending arms 38 as best shown in Fig. 6, and two forwardly extending arms 40 as best shown in Fig. 4. The arms 38 of each bracket are provided with bearings 42 at their lower ends for a rock shaft 44 to which a saw supporting structure is secured which in the embodiment shown consists of two arms 46 intermediately secured to the shaft as will be understood from Fig. 3. A shaft 48 is rotatably mounted in a gear box 50 carried by the front ends of the arms 46. This latter shaft has a circular saw 52 secured thereto outside the gear box and a bevel gear 54 secured thereto inside the gear box as shown in Fig. 14. The bevel gear 54 is in mesh with a bevel gear 56 secured to the forward end of a shaft 58 which is connected by coupling 60 to the shaft of a motor 62, this motor preferably being an electric motor which is mounted on the rear ends of the arms 46. To the arms 46 are secured the two branches of an upwardly extending yoke member 64 which at its upper end carries a bearing 66 for the shaft 58, as best shown in Fig. 8. As will be seen by referring to Fig. 7, vertical rods 68 are pivotally attached to the ends of a rod 70 secured to the arms 46. The rods 68 extend upwardly through openings in the forwardly extending arms 40 previously referred. The upper portions of the rods 68 are surrounded by coiled springs 72 which are interposed between the arms 40 and enlargements such as washers 74 placed on the upper ends of the rods 68. A cylinder 76 is secured at its upper end to arms 78 extending out from the beam 34. Working in the cylinder 76 is a piston 80 which is connected by a rod 82 with the central portion of a yoke member 84, the lower ends of whose branches are pivotally connected with the arms 46 as shown in Fig. 7. A pipe 86 leads into the upper portion of the cylinder 76, the upper end of this pipe being connected to an elbow member 88 containing a check valve 90. The member 88 is connected to a T-member 92 which in turn is connected by a short pipe section 93 with a valve casing 94 containing a partition 96 provided with an opening containing a valve seat with which cooperates a valve 98 normally held upwardly against the seat by a coiled spring 100. The T-member 92 is connected with the space in the valve casing above the partition 96 while a supply pipe 102 for operating medium such as compressed air is connected with the space below the partition. The valve casing 94 is provided with a packing gland 104 in which a tube 106 is slidably mounted. The lower end of this tube is beveled in order to make a close fit with the beveled upper end of the valve 98 and the tube is normally held upwardly by a coiled spring 108 placed between the gland and an enlargement 110 on the upper end of the tube. The enlargement 110 is pivotally attached to one end of a bell-crank lever 112 pivoted to an extension 114 of the valve casing while attached to the other end of the bell crank is an operating cord 116 which when pulled depresses the tube 106, thereby opening the valve 98 and permitting compressed air to flow past the check valve 90 and through the pipe 86 into the upper end of the cylinder 76. As shown in Figs. 5 and 9, this cylinder is provided with a by-pass chamber 118 which at its lower end is connected by perforations 119 with the interior of the cylinder. The upper end of the chamber 118 is connected by a pipe 120 with the T-member 92. It will be understood from Fig. 12 that there is one of the operating mechanisms just described associated with each of the swinging saw supports and that the number of the latter may be as many as desired.

The operation and advantages of my invention will be apparent in connection with the foregoing description. Boards which are to be cut into lengths are carried by the conveyor 28 to the feeding chains 24 and when the boards reach the position shown in Fig. 1, the saws are depressed into the position shown in Fig. 2 and while the boards are fed along by engagement with the lugs 26, they will be cut into lengths as indicated in Fig. 13. In order to depress the saws at the proper time, the operator pulls the cords 116. It will be understood that these cords will be arranged for simultaneous pulling operation as by being attached to a common pulling member. Each cord 116 when pulled, operates the associated bell-crank lever 112 to depress the tube 106 which is connected therewith. The lower end of the tube 106 as will be apparent from Fig. 10 comes into substantially airtight engagement with the valve 98 and opens the same thereby permitting the compressed air to flow through the pipe 86 into the upper portion of the cylinder 76. This action quickly depresses the piston 80 and causes the forward portion of the arms 46 carrying the saw 52 to swing downwardly. When the boards have been cut, the operator releases the cords 116 and the springs 72 which have been compressed tend to swing the arms 46 into initial position. At the beginning of the releasing operation, the spring 108 immediately lifts the tube 106 from engagement with the valve 98 which thereupon closes and shuts off further supply of compressed air. The compressed air in the cylinder 76 at first escapes through the perforations 119 into the chamber 118 from which it passes through the pipe 120 into the space above the partition 96 and then escapes through the tube 106. This portion of the releasing action takes place rapidly, but when the piston 80 rises above the perforations 119, the remaining air in the cylinder 76 leaks slowly past the piston 80 which produces a cushioning effect and prevents the swinging support from coming to rest in upward position with a shock. It will be understood that the motor on the rear ends of the arms 46 partly counterbalances the front portions of the arms and the mechanism mounted thereon.

I claim:

1. A sawing machine comprising means for feeding boards, a beam, a swinging support pivotally mounted between its ends on said beam, a circular saw mounted on the front end of said support, a motor mounted on the rear end of said support, driving connections between said motor and saw, rods pivotally attached at one end to the forward portion of said support, arms secured to said beam, said arms having openings through which said rods extend, enlargements on the other ends of said rods, springs between said enlargements and arms normally holding the front end of said support upwardly, and means for depressing said front end in opposition to the tension of said springs.

2. A sawing machine comprising means for feeding boards, a fixed supporting member, a swinging support pivotally mounted between its ends on said member, a circular saw mounted on the front end of said swinging support, a motor mounted on the rear end of said swinging support, driving connections between said motor and saw, rods pivotally attached at one end to the forward portion of said swinging support, springs encircling said rods for normally holding the front end of said swinging support upwardly, and fluid operated mechanism attached to the front portion of said swinging support independently of said rods for depressing said front end in opposition to the tension of said springs.

3. A sawing machine comprising means for feeding boards, a fixed supporting member, a swinging support pivotally mounted between its ends on said member, a circular saw mounted on the front end of said swinging support, a motor mounted on the rear end of said swinging support, driving connections between said motor and saw, spring means operating in connection with said swinging support for normally holding the front end thereof upwardly, and fluid operated mechanism attached to said swinging support independently of said spring means for depressing the front end of said swinging support in opposition to the tension of said spring means.

In testimony whereof I hereunto affix my signature.

HENRY C. HILKE.